United States Patent
Osterling

(10) Patent No.: US 7,529,215 B2
(45) Date of Patent: May 5, 2009

(54) ENCAPSULATION OF INDEPENDENT TRANSMISSIONS OVER INTERNAL INTERFACE OF DISTRIBUTED RADIO BASE STATION

(75) Inventor: Jacob Kristian Osterling, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 497 days.

(21) Appl. No.: 10/909,836

(22) Filed: Aug. 3, 2004

(65) Prior Publication Data

US 2005/0105552 A1    May 19, 2005

Related U.S. Application Data

(60) Provisional application No. 60/520,323, filed on Nov. 17, 2003, provisional application No. 60/520,324, filed on Nov. 17, 2003, provisional application No. 60/520,364, filed on Nov. 17, 2003, provisional application No. 60/520,325, filed on Nov. 17, 2003.

(51) Int. Cl.
    H04Q 7/24      (2006.01)
    H04W 24/00     (2006.01)
(52) U.S. Cl. .................................... 370/338; 455/456.6
(58) Field of Classification Search ................. 370/338
    See application file for complete search history.

(56) References Cited

U.S. PATENT DOCUMENTS

| 5,870,392 | A  | * | 2/1999 | Ann .......................... 370/335 |
| 6,337,659 | B1 | * | 1/2002 | Kim .......................... 342/373 |
| 6,429,974 | B1 |   | 8/2002 | Thomas et al. |

(Continued)

FOREIGN PATENT DOCUMENTS

EP    1 294 045 A1    3/2003

(Continued)

OTHER PUBLICATIONS

Common Public Radio Interface (CPRI) Interface Specification Version 1.2 (Sep. 26, 2003).

(Continued)

*Primary Examiner*—Wing F Chan
*Assistant Examiner*—Eunsook Choi
(74) *Attorney, Agent, or Firm*—Nixon & Vanderhye, P.C.

(57) ABSTRACT

A distributed radio base station (20) comprises a radio equipment controller (REC) (22) situated at a main site (23) and a radio equipment (RE) (24) situated at a remote site (25). A remote unit (102, 104, 106, 108, 110, 124) configured to engage in direct communications with the radio equipment controller (REC) is also situated at the remote site (25). An internal interface (26) connects the radio equipment controller (REC) and the radio equipment (RE). Advantageously, the internal interface (26) also encapsulates the direct communications between the radio equipment controller (REC) (22) and the remote unit, thereby obviating a separate physical link between the radio equipment controller (REC) and the remote unit. A new physical link (130) transmits, between the radio equipment (RE) and the remote unit, the direct communications between the radio equipment controller (REC) and the remote unit which are encapsulated over the internal interface (26). The remote unit can take various differing forms, including that of an antenna (102) with remote electrical tilt control; a tower mounted amplifier (TMA) (104); a Transmission network unit (106); a separate radio base station (108) which is co-located at the remote site; a proprietary equipment unit (110); or even one or more cascaded radio equipments (RE) (124).

25 Claims, 12 Drawing Sheets

U.S. PATENT DOCUMENTS

| | | | |
|---|---|---|---|
| 6,434,137 B1 * | 8/2002 | Anderson et al. | 370/347 |
| 6,549,531 B1 * | 4/2003 | Charas | 370/347 |
| 6,836,660 B1 * | 12/2004 | Wala | 455/434 |
| 6,865,169 B1 * | 3/2005 | Quayle et al. | 370/335 |
| 7,127,175 B2 * | 10/2006 | Mani et al. | 398/115 |
| 2003/0076907 A1 | 4/2003 | Harris | |
| 2003/0093540 A1 | 5/2003 | Lioy | |
| 2004/0125740 A1 | 7/2004 | Gardner | |
| 2004/0174927 A1 * | 9/2004 | Cooper | 375/142 |
| 2005/0105534 A1 | 5/2005 | Österling | |
| 2005/0107124 A1 | 5/2005 | Österling et al. | |
| 2006/0088125 A1 | 4/2006 | Miyatani et al. | |
| 2007/0019679 A1 | 1/2007 | Scheck et al. | |
| 2007/0058742 A1 | 3/2007 | Demarco et al. | |
| 2007/0091896 A1 | 4/2007 | Liu | |
| 2007/0116046 A1 | 5/2007 | Liu et al. | |
| 2007/0133477 A1 | 6/2007 | Ebert et al. | |
| 2007/0147488 A1 | 6/2007 | Han | |
| 2007/0160012 A1 | 7/2007 | Liu et al. | |

FOREIGN PATENT DOCUMENTS

| | | |
|---|---|---|
| EP | 1 367 841 | 12/2003 |
| WO | 03/047130 A1 | 6/2003 |

OTHER PUBLICATIONS

Common Public Radio Interface (CPRI) Interface Specification Version 1.1 (May 10, 2004).

International Search Report mailed Mar. 1, 2005 in corresponding PCT application No. PCT/SE2004/001673.

International Search Report mailed Feb. 28, 2005 in corresponding PCT application PCT/SE2004/001675.

International Search Report mailed Feb. 28, 2005 in corresponding PCT application PCT/SE2004/001674.

U.S. Office Action mailed Feb. 26, 2008 in corresponding U.S. Appl. No. 10/909,835.

* cited by examiner

ENCAPSULATION OF INDEPENDENT TRANSMISSIONS OVER INTERNAL INTERFACE OF DISTRIBUTED RADIO BASE STATION

This application claims the benefit and priority of the following U.S. Provisional Patent Applications Ser. No. , all of which are incorporated herein by reference: (1) U.S. Provisional Application 60/520,323 filed Nov. 17, 2003, entitled "Encapsulation of Diverse Protocols Over Internal Interface of Distributed Radio Base Station"; (2) U.S. patent application Ser. No. 60/520,324 filed Nov. 17, 2003, entitled "Encapsulation of Independent Transmissions Over Internal Interface of Distributed Radio Base Station"; (3) U.S. Patent Application Ser. No. 60/520,364 filed 11/17/2003, entitled "Interface, Apparatus, and Method for Cascaded Radio Units In A Main-Remote Radio Base Station"; and, (4) U.S. Patent Application Ser. No. 60/520,325 filed Nov. 17, 2003, entitled "Pre-Start-Up Procedure For Internal Interface of Distributed Radio Base Station". This application is related to the following simultaneously filed U.S. patent applications, all of which are incorporated by reference herein in their entirety: (1) U.S. patent application Ser. No. 10/909,835 entitled "Encapsulation of Diverse Protocols Over Internal Interface of Distributed Radio Base station" and (2) U.S. patent application Ser. No. 10/909,843 entitled "Pre-Start-Up Procedure For Internal Interface of Distributed Radio Base station".

BACKGROUND

1. Field of the Invention

This application is related to radio access networks involved in wireless telecommunications, and particularly relates to an internal interface (such as the Common Public Radio Interface (CPRI)) of a radio base station which links a radio equipment portion of the radio base station to a radio equipment control portion of the base station.

2. Related Art and Other Considerations

In a typical cellular radio system, wireless user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network. Alternatively, the wireless user equipment units can be fixed wireless devices, e.g., fixed cellular devices/terminals which are part of a wireless local loop or the like.

The radio access network (RAN) covers a geographical area which is divided into cell areas, with each cell area being served by a radio base station. A cell is a geographical area where radio coverage is provided by the radio equipment at a base station site. Each cell is identified by a unique identity, which is broadcast in the cell. The radio base stations communicate over the air interface (e.g., radio frequencies) with the user equipment units (UE) within range of the base stations. In the radio access network, several base stations are typically connected (e.g., by landlines or microwave) to a control node known as a base station controller (BSC) or radio network controller (RNC). The control node supervises and coordinates various activities of the plural radio base stations connected thereto. The radio network controllers are typically connected to one or more core networks.

One example of a radio access network is the Universal Mobile Telecommunications (UMTS) Terrestrial Radio Access Network (UTRAN). The UMTS is a third generation system which, at least in some respects, builds upon the radio access technology known as Global System for Mobile communications (GSM) developed in Europe. UTRAN is essentially a radio access network providing wideband code division multiple access (WCDMA) to user equipment units (UEs).

In many radio access networks the radio base station is a concentrated node with essentially most of the components being located at concentrated site. In the future mobile network operators may be afforded more flexibility if the radio base station is configured with a more distributed architecture. For example, a distributed radio base station can take the form of one or more radio equipment portions that are linked to a radio equipment control portion over a radio base station internal interface.

One example of an internal interface of a radio base station which links a radio equipment portion of the radio base station to a radio equipment control portion of the base station is the Common Public Radio Interface (CPRI). The Common Public Radio Interface (CPRI) is described in Common Public Radio Interface Specification Version 1.0 (Sep. 26, 2003) and Version 1.1 (May 10, 2004), and which are incorporated by reference herein in their entirety.

As illustrated in FIG. 13, the radio equipment control portion can take the form of a radio equipment controller (REC) 1322 which is located at a main site 1323. The radio equipment portion, such as radio equipment (RE) 1324, is typically situated at a remote site 1325. There may also be various other structures or units located at either the main site or the remote site which comprise, interface, or communicate with the radio base station. For example, FIG. 13 shows a horizontal pole or mast 1300 at the remote site 1325 which supports and holds aloft at least one or more antenna 1302. At the remote site also are one or more tower mounted amplifiers (TMA) 1304 which are connected between antenna 1302 and radio equipment (RE) 1324. The antenna 1302 may be a remote electrical tilt (RET) antenna, i.e., an antenna whose tilt can be controlled by radio equipment controller (REC) 1322 for controlling the coverage area. In addition, some radio base stations are in communication with other nodes of the radio access network (RAN) over radio based transmission links via one or more Transmission network units 1306. The Transmission network unit(s) 1306 serve, e.g., to receive the radio transmissions from other RAN nodes and to forward the transmissions over traditional transmission lines (e.g., E1/T1 or STM1) to the radio base station.

As shown in FIG. 13, a cable for the internal interface 1326 which connects the radio equipment controller (REC) 1322 and the radio equipment (RE) 1324 is conventionally only one of the cables extending between main site 1323 and remote site 1325. Additionally there are other cables, such as (for example) a transmission cable 1310 which extends between radio equipment controller (REC) 1322 and the Transmission network unit 1306 for the above-mentioned purpose of forwarding the transmissions over traditional transmission lines (e.g., E1/T1 or STM1) to the radio base station. In FIG. 13, the N number of E1s refers to the transmission need of the radio base station, which is typically two to eight E1s.

One or more antenna control cables 1312 may also extend between the main site 1323 and remote site 1325. Each antenna control cable 1312 has a proximal end connected to radio equipment controller (REC) 1322, and distal connections at remote site 1325. For example, the antenna control cable 1312 can be connected to distinct remote units in the form of the tower mounted amplifiers (TMA) 1304. If the antenna 1302 is a remote electrical tilt (RET) antenna, the antenna control cable 1312 can also be connected to a RET unit or other suitable controls of antenna 1302. Often each antenna unit has its own antenna control cable (e.g., a six antenna radio base station may typically have six antenna control cables). Sometimes the TMA and RET share cables.

As illustrated in FIG. 13, there are several cables extending from radio equipment controller (REC) 1322 to the remote site 1325 and up the mast 1300. The radio equipment (RE) 1324 itself may be mounted on mast 1300 as shown in FIG. 13. Each of the cables requires separate monitoring and maintenance, and each is subject to environmental or external influences and circumstances.

What is needed therefore, and an object of the present invention, is a technique for consolidating transmissions between a radio equipment controller (REC) and a radio equipment (RE) 24 of a distributed radio base station.

BRIEF SUMMARY

A distributed radio base station comprises a radio equipment controller (REC) situated at a main site and a radio equipment (RE) situated at a remote site. A remote unit configured to engage in direct communications with the radio equipment controller (REC) is also situated at the remote site. An internal interface connects the radio equipment controller (REC) and the radio equipment (RE). Advantageously, the internal interface also encapsulates the direct communications between the radio equipment controller (REC) and the remote unit, thereby obviating a separate physical link between the radio equipment controller (REC) and the remote unit. A new physical link transmits, between the radio equipment (RE) and the remote unit, the direct communications between the radio equipment controller (REC) and the remote unit which are encapsulated over the internal interface.

In one example mode of implementation, the internal interface is a Common Public Radio Interface (CPRI) as described in Common Public Radio Interface Specification Version 1.0 (Sep. 26, 2003) and Version 1.1 (May 10, 2004). Preferably, the direct communications between the radio equipment controller (REC) and the remote unit are encapsulated in an unused, free, or unallocated portion of a layer 2 protocol of the CPRI. For example, the direct communications between the radio equipment controller (REC) and the remote unit may be encapsulated in a vendor specific information flow of the layer 2 protocol. Alternatively, as another non-limiting example, the direct communications between the radio equipment controller (REC) and the remote unit may be encapsulated in an unused, free, or unallocated portion of user plane information of the layer 2 protocol.

The remote unit can take various differing forms. For example, in one example embodiment the remote unit is a tower mounted amplifier (TMA). In another example embodiment, the remote unit is an antenna with remote electrical tilt control. In yet another embodiment, the remote unit can be in radio communication with a radio access network (RAN) node. In still another embodiment, the remote unit can be a separate radio base station which is co-located at the remote site (such as, for example, a GSM micro radio base station). Yet further, the remote unit can be a proprietary equipment unit, or even one or more cascaded radio equipments (RE). In yet another embodiment, the remote unit can be a part of the transmission network serving the radio access network, such as a microwave transmission unit.

BRIEF DESCRIPTION OF THE DRAWINGS

FIG. 13 is a diagrammatic view showing a conventional manner of using plural cables between a radio equipment controller (REC) at a main site and a remote site for facilitating plural, parallel communication flows.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
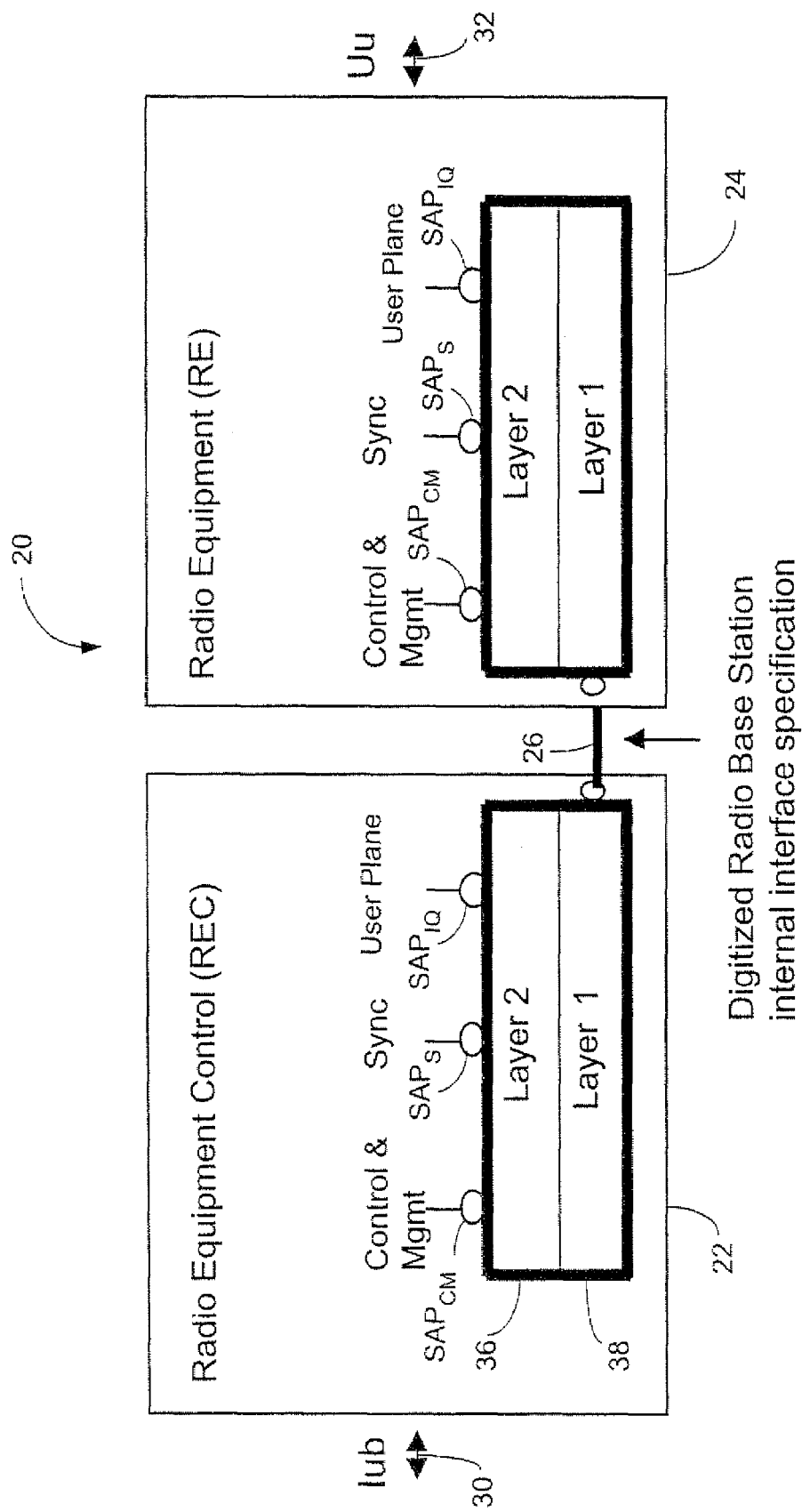
FIG. 1 is a schematic view of an example embodiment of a distributed radio base station.

FIG. 1 shows an example embodiment of a distributed radio base station 20. The radio base station 20 comprises both a radio equipment controller (REC) 22 and a radio equipment (RE) 24. The radio equipment controller (REC) 22 and radio equipment (RE) 24 are connected by an internal interface 26. In the example implementation herein described, internal interface 26 is a CPRI link. Details of structure and operation of radio base station 20 and an internal interface 26 which takes the form of a CPRI link are understood from the Common Public Radio Interface Specification Version 1.0 (Sep. 26, 2003) and Version 1.1 (May 10, 2004), which are incorporated by reference herein in their entirety. As in the specification, the description herein is based on the UMTS (Universal Mobile Telecommunication System) nomenclature. However, the radio base station 20 and the internal interface 26 may operate in accordance with other radio standards.

The radio equipment controller (REC) 22 and radio equipment (RE) 24 may be physically separated (i.e., the radio equipment (RE) 24 may be close to the antenna, whereas the radio equipment controller (REC) 22 may be located in a conveniently accessible site). Alternatively, both radio equipment controller (REC) 22 and radio equipment (RE) 24 may be co-located as in a conventional radio base station design. Whatever the distance therebetween, in view of their physical separation the location of the radio equipment controller (REC) 22 is known as the main site and the location of the radio equipment (RE) 24 is known as the remote site.

As illustrated in FIG. 1, radio equipment controller (REC) 22 provides an access towards an unillustrated Radio Network Controller via the Jub interface 30 (for the UMTS radio access network). Basically, the radio equipment controller (REC) 22 is concerned with the Jub transport and Jub protocols, the Node B (base station) control and management, as well as the digital baseband processing. For the downlink(i.e., from radio equipment controller (REC) 22 to radio equipment (RE) 24), the radio equipment controller (REC) 22 handles such operations as channel coding, interleaving, spreading, scrambling, adding of physical channels, controlling transmit power of each physical channel, frame and slot signal generation (including clock stabilization). For the uplink (i.e., from radio equipment (RE) 24 to radio equipment controller (REC) 22 ), the radio equipment controller (REC) 22 handles such operations as channel de-coding, de-interleaving, de-spreading, de-scrambling, signal distribution to signal processing units, detection of feedback information for transmit power control, and signal to interference ratio measurement.

The radio equipment (RE) 24 serves the air interface 32 to the user equipment (in an UMTS network the air interface is called the Uu interface). The user equipment unit, or mobile station, is not illustrated in FIG. 1. The radio equipment (RE) 24 provides the analogue and radio frequency functions such as filtering, modulation, frequency conversion and amplification. For the downlink, the radio equipment (RE) 24 performs operations such as digital to analogue conversion, up conversion, on/off control of each carrier, carrier multiplexing, power amplification and limiting, antenna supervision, and RF filtering. For the uplink, the radio equipment (RE) 24 performs operations such as analogue to digital conversion, down conversion, automatic gain control, carrier de-multiplexing, low noise amplification, and RF filtering.

Thus, the radio equipment controller (REC) 22 comprises the radio functions of the digital baseband domain, whereas the radio equipment (RE) 24 contains the analogue radio frequency functions. The functional split between both parts is done in such a way that a generic interface based on In-Phase and Quadrature (IQ) data can be defined.

Figure 2:
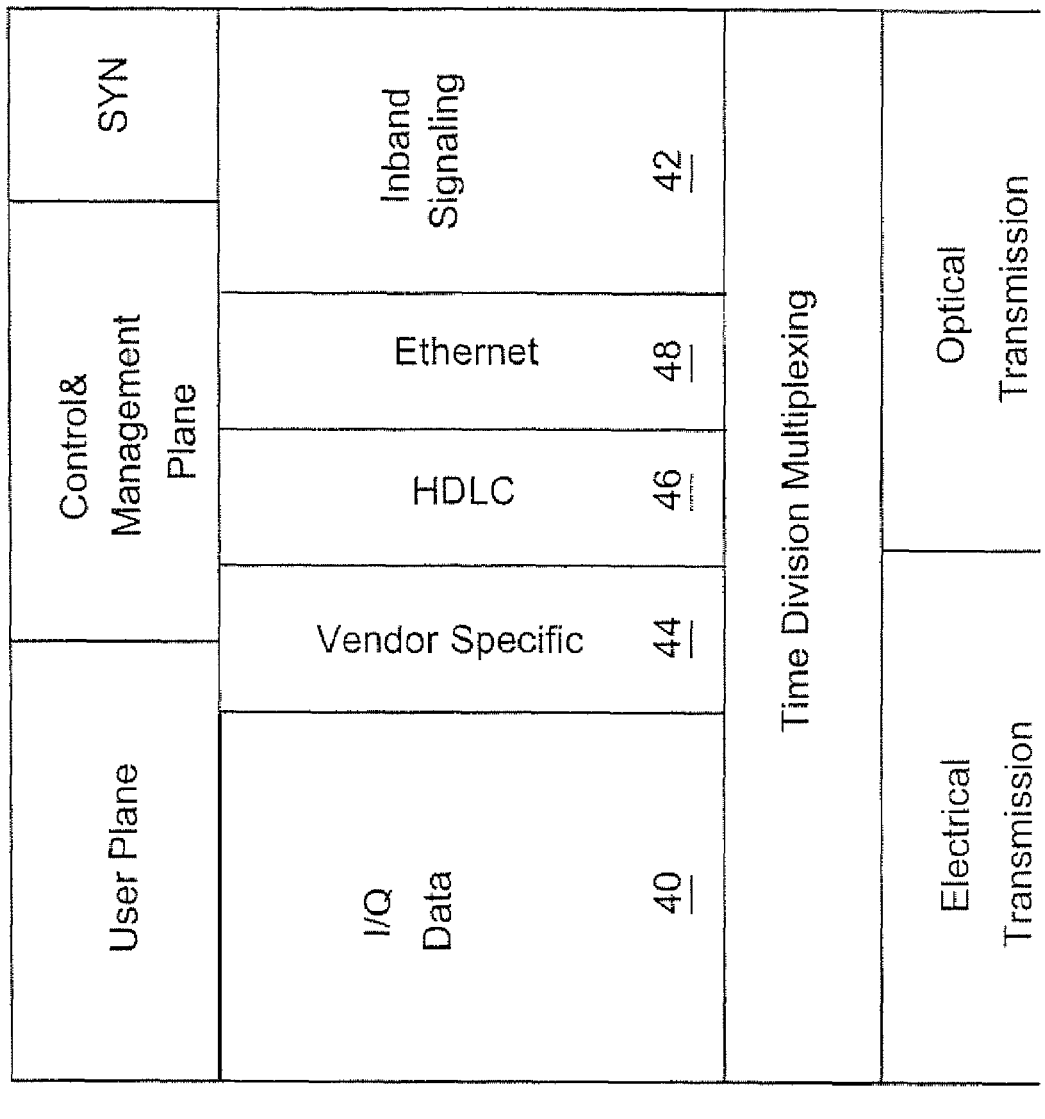
FIG. 2 is a diagrammatic view of a protocol overview for an interface between radio equipment controller (REC) 22 and a radio equipment (RE) 24.

The Common Public Radio Interface Specification Version 1.0 (Sep. 26, 2003) and Version 1.1 (May 10, 2004) define protocols for the physical layer 38(layer 1) and the data link layer 36 (layer 2). Layer 1 defines, e.g., electrical characteristics, optical characteristics, time division multiplexing of the different data flows, and low level signaling. Layer 2 defines the media access control, flow control and data protection of the control and management information flow. The Common Public Radio Interface Specification Version 1.0 (Sep. 26, 2003) and Version 1.1 (May 10, 2004) further describe four protocol data planes: control plane, management plane, user plane, and synchronization. These four protocol data planes are illustrated in FIG. 2.

The control plane involves control data flow used for call processing. The management plane carries management information for the operation, administration and maintenance of the CPRI link and the radio equipment (RE) 24. The control and management data is exchanged between control and management entities with the radio equipment controller (REC) 22 and radio equipment (RE) 24, and is given to higher protocol layers. The control and management plane is mapped to a single information flow over the CPRI link.

The user plane concerns data that has to be transferred from the radio base station to the mobile station and vice versa. The user plane data is transported in the form of in-phase and quadrature (IQ) modulation data (digital base band signals), represented by block 40 in FIG. 2. Several IQ data flows will be sent via one physical CPRI link 26. Each IQ data flow reflects the data of one antenna for one carrier, the so-called antenna-carrier (AxC). In general, without regard to specific protocol, one antenna-carrier is the amount of digital baseband (IQ) U-plane data necessary for either reception of transmission of one FDD carrier at one independent antenna element. An AxC container contains the IQ samples of one AxC for one UMTS chip duration. Each flow in the user plane has reserved a certain bit field per frame, denoted as the AxC carrier. When the internal interface 26 is a CPRI interface, the AxC container contains samples of a chip an a UTRA-FDD carrier.

Synchronization pertains to data flow which transfers synchronization and timing information between radio equipment controller (REC) 22 and radio equipment (RE) 24. Synchronization data is used for alignment of the 8B/10B coder as well as the detection of chip, hyperframe, radio frame boundaries, and associated frame numbering.

Inband signaling, depicted by block 42 in FIG. 2, is signaling information that is related to the link and is directly transported by the physical layer. This information is required, e.g. for system startup, layer 1 link maintenance and the transfer of time critical information that has a direct time relationship to layer 1 user data.

Block 44 of FIG. 2 shows vendor specific information, i.e., an information flow which is reserved for vendor specific information. This vendor specific information area typically has about 50 Mbps free bandwidth.

There are service access points (SAP) for all protocol data plane layer 2 services which are used as reference points for performance measurements. As illustrated in FIG. 1, for both radio equipment controller (REC) 22 and radio equipment (RE) 24 there are service access points $SAP_{CM}$, $SAP_S$, and $SAP_{IQ}$ for the control & management planes, the synchronization plane, and the user plane, respectively.

Thus, in addition to the user plane data (IQ data), control and management as well as synchronization signals have to be exchanged between radio equipment controller (REC) 22 and radio equipment (RE) 24. All information streams are multiplexed onto a digital serial communication line using appropriate layer 1 and layer 2 protocols. The different information flows have access to the layer 2 via the appropriate service access points (SAPs). These information streams define the common public radio interface.

The IQ data of different antenna carriers are multiplexed by a time division multiplexing scheme onto an electrical or optical transmission line forming the internal interface 26. The Control and Management data are either sent as inband signalling (for time critical signalling data) or by layer 3 protocols (not defined by Common Public Radio Interface Specification Version 1.0 (Sep. 26, 2003) and Version 1.1 (May 10, 2004) that reside on top of appropriate layer 2 protocols. Two different layer 2 protocols—High Data Level Link Control (HDLC) and Ethernet, depicted as 46 and 48, respectively, in FIG. 2—are supported by CPRI. These additional control and management data are time multiplexed with the IQ data. Finally, additional time slots are available for the transfer of any type of vendor specific information (block 42).

Figure 3A:
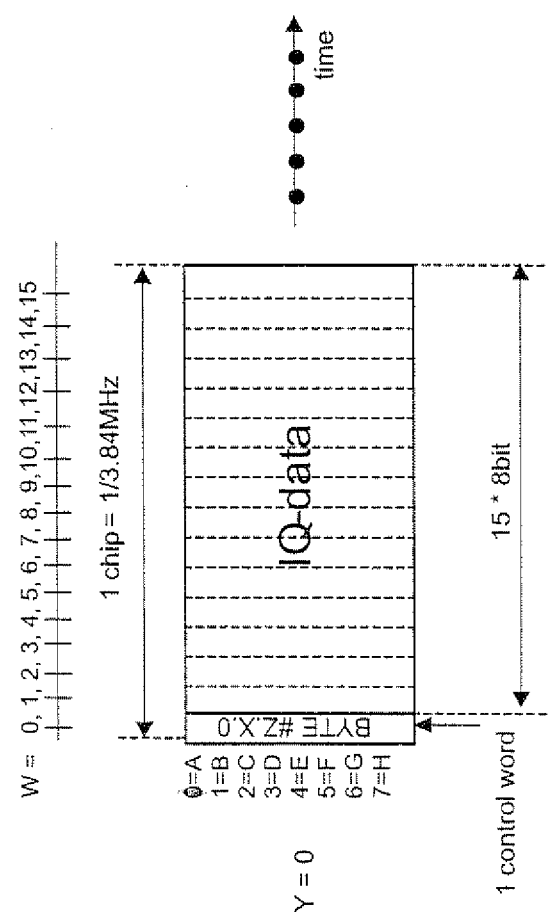
FIG. 3A is a diagrammatic view of basic frame structure for one example data rate for use over an internal interface for the distributed base station.

Information flow over the internal interface 26 of radio base station 20 is carried in frames. In the example implementation which is compatible with Common Public Radio Interface Specification Version 1.0 (Sep. 26, 2003) and Version 1.1 (May 10, 2004), the length of a basic frame is 1 Tchip=1/3.84 MHz=260.416667 ns. As shown in FIG. 3A, for such compatible implementation a basic frame consists of 16 words with index W=0 . . . 15. The word with the index W=0, 1/16 of the basic frame, is used for one control word. The length T of the word depends on the total data rate. The Common Public Radio Interface Specification Version 1.0 (Sep. 26, 2003) and Version 1.1 (May 10, 2004) define three alternative data rates, each with differing word lengths: 614.4 Mbit/s (length of word T=8); 1228.8 Mbit/s (length of word T=16); and 2457.6 Mbit/s (length of word T=32). FIG. 3A illustrates the frame structure for the 614.4 Mbit/s total data rate.

Figure 3B:
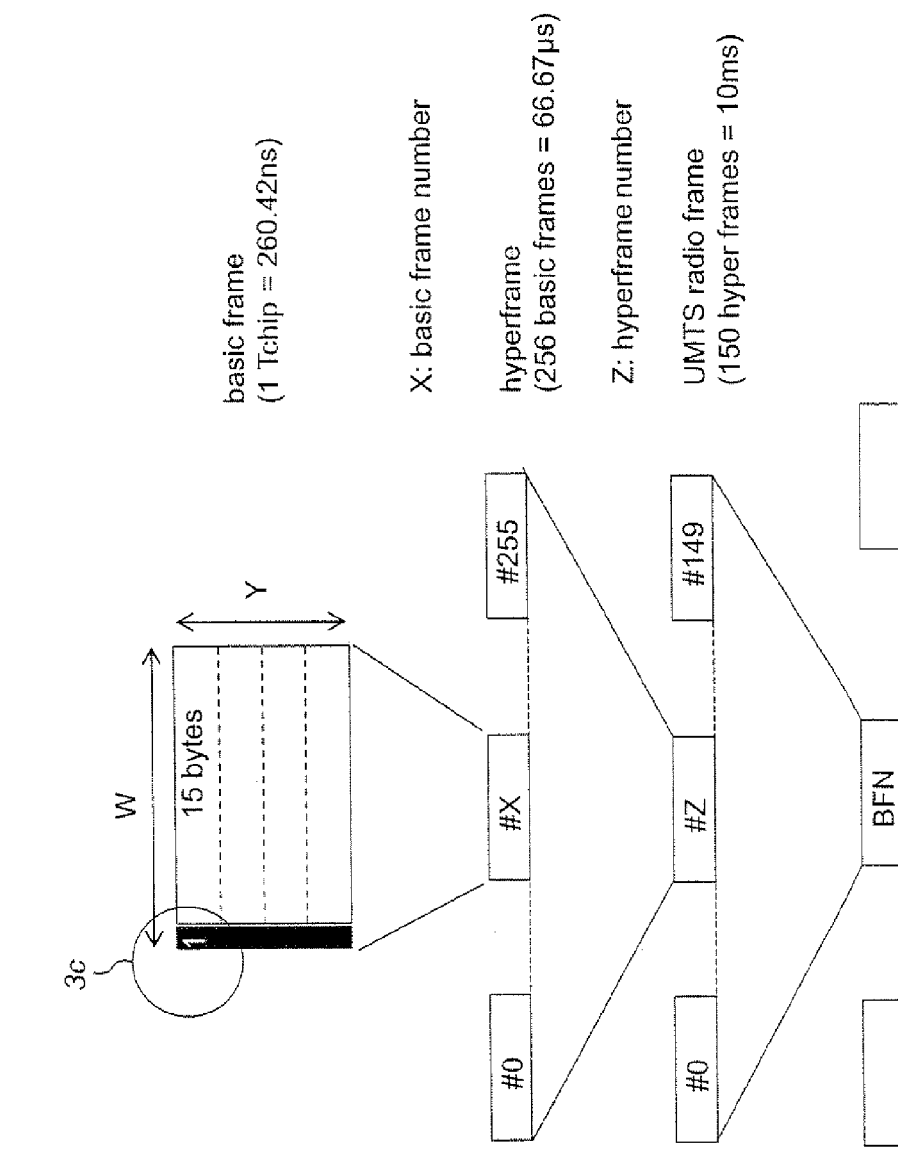
FIG. 3B is a diagrammatic view of a hyperframe structure for one example implementation.
Figure 3C:
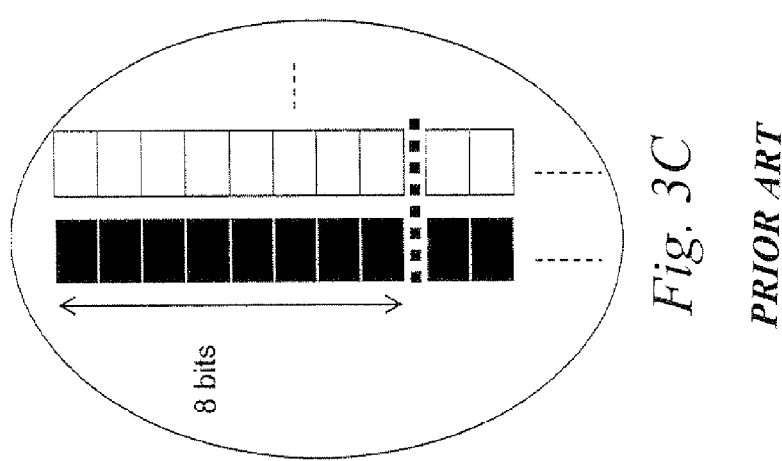
FIG. 3C is an enlargement of a portion of FIG. 3B.

The Common Public Radio Interface Specification Version 1.0 (Sep. 26, 2003) and Version 1.1 (May 10, 2004) also define a hyperframe structure which is hierarchically embedded between the basic frame and the UMTS radio frame as shown in FIG. 3B. In FIG. 3B, Z in the hyperframe number; X is the basic frame number within a hyperframe; W is the word number within a basic frame; and Y is the byte number within a word. The control word is defined as word with rank W=0. Each bit within a word can be addressed with the index B, where B=0 is the LSB of the BYTE Y=0, B=8 is the LSB of BYTE Y=1, B=16 is the LSB of BYTE Y=2, and B=24 is the LSB of BYTE Y=3.

Figure 4:
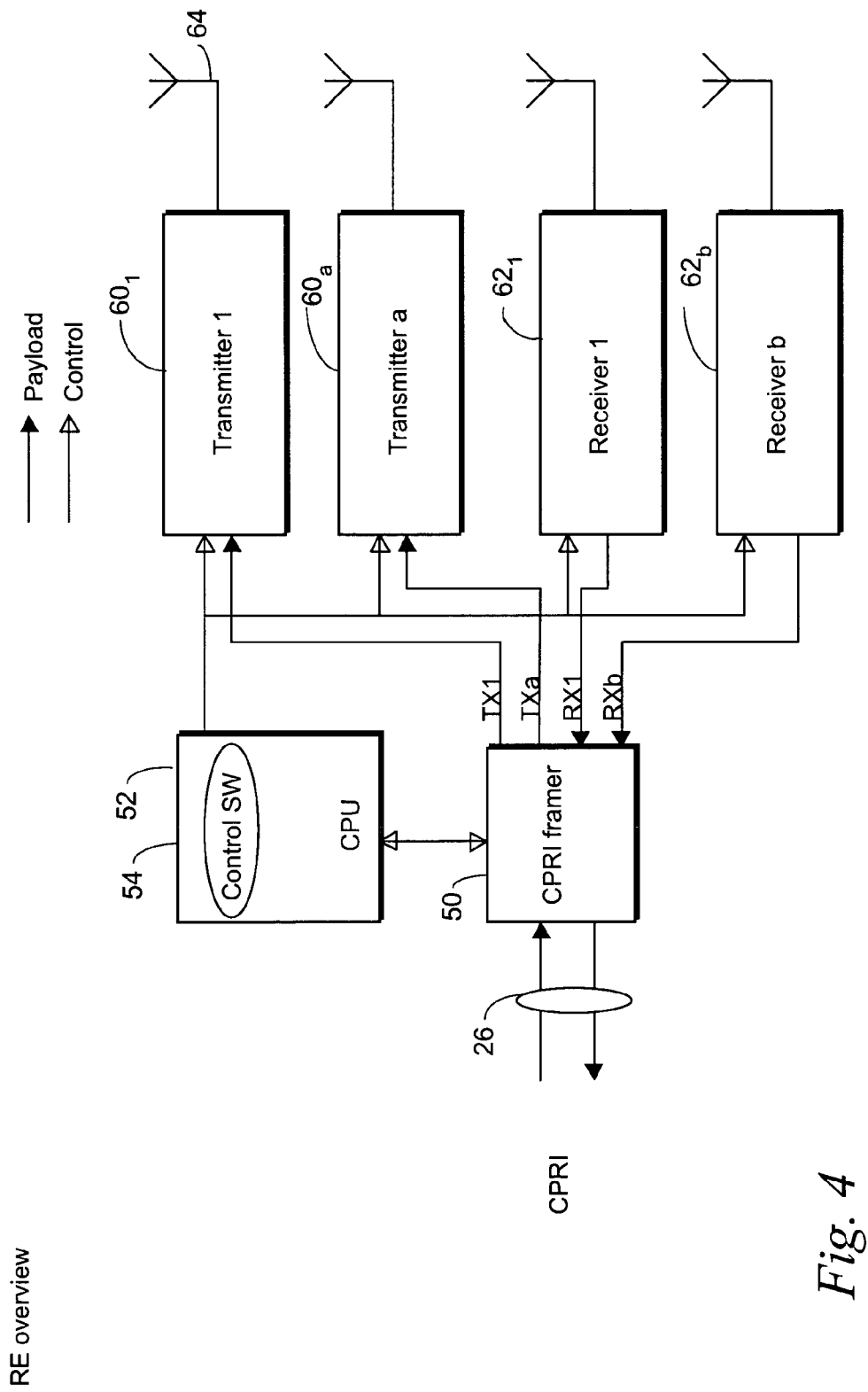
FIG. 4 is a schematic view of selected aspects of an example radio equipment (RE) portion of the distributed radio base station of FIG. 4.

FIG. 4 shows pertinent basic aspects of an example radio equipment (RE) 24 as comprising a framer 50 which is ultimately connected to internal interface 26, i.e., the CPRI interface. The framer 50 works in conjunction with a CPU or processor 52 of radio equipment (RE) 24. The processor 52 executes control software (SW) 54 which governs operation, e.g., of framer 50 and terminates the application layer communication towards the radio equipment controller (REC) 22. In addition, radio equipment (RE) 24 comprises plural transmitters (such as transmitter $60_1$ and transmitter $60_a$), and plural receivers (such as receiver $62_1$ and receiver $62_b$). The transmitters 60 and receivers 62 can be either single-standard or multistandard. Each transmitter 60 and each receiver 62 is connected to a corresponding antenna 64 (which is distinct from and does not comprise radio equipment (RE) 24). The framer 50 is connected to forward payload information obtained from internal interface 26 to each of the transmitters 60 (as shown by lines terminated with solid arrowheads), and to receive information from each of the receivers 62 to be forwarded from radio equipment (RE) 24 over the internal interface 26 to radio equipment controller (REC) 22 (again as indicated by lines terminated with solid arrowheads, but having a reverse direction toward rather than away from framer 50). The processor 52 is connected to send control information or control signals to each of framer 50, the transmitters 60, and the receivers 62, as shown by lines terminated with non-solid arrowheads).

Figure 5:
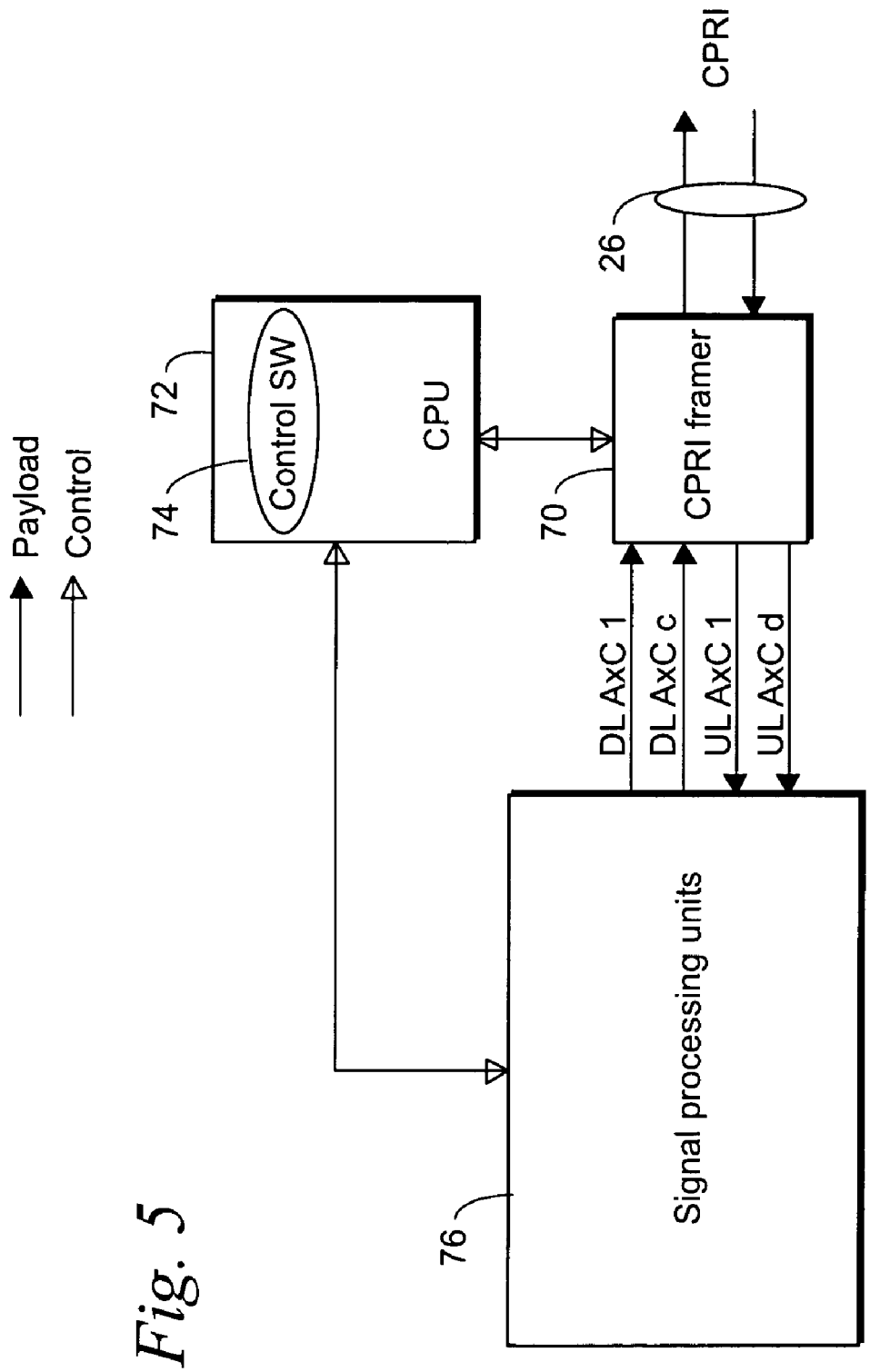
FIG. 5 is a schematic view of selected aspects of a radio equipment controller (REC) portion of the distributed radio base station of FIG. 4.

FIG. 5 shows pertinent basic aspects of an example radio equipment controller (REC) 22 as comprising a framer 70 which is ultimately connected to internal interface 26, i.e., the CPRI interface. The framer 70 works in conjunction with a CPU or processor 72 of radio equipment controller (REC) 22. The processor 72 executes control software (SW) 74 which governs operation, e.g., of framer 70. In addition, radio equipment controller (REC) 22 comprises signal processing units collectively indicated as 76 in FIG. 5. The radio equipment controller (REC) 22 of FIG. 5 is shown as handling antenna carriers (AxC) AxC 1 and AxC c on the downlink (DL), and antenna carriers (AxC) AxC 1 and AxC d on the uplink (UL).

Figure 6:
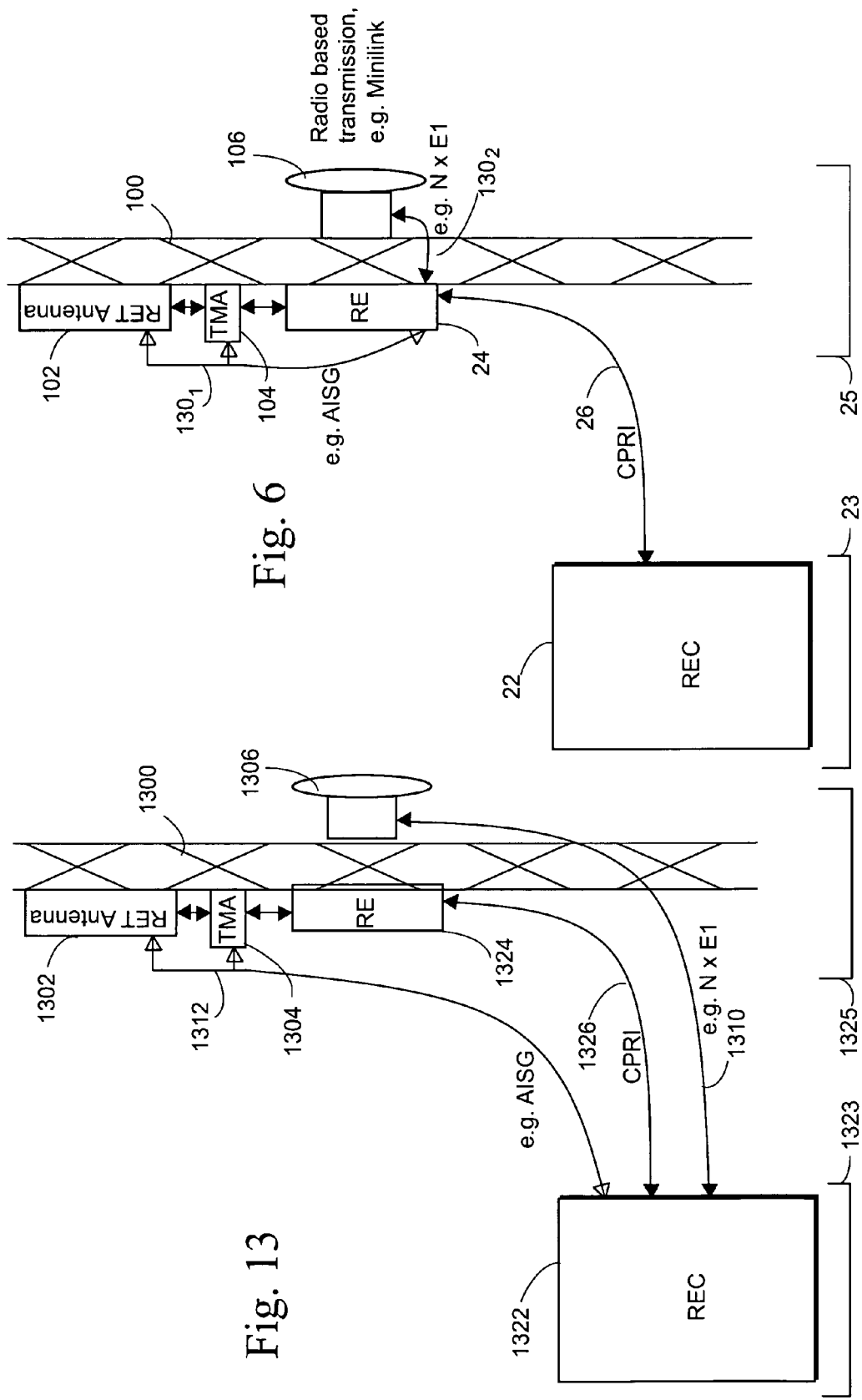
FIG. 6 is a diagrammatic view showing a radio base station wherein direct communications between a radio equipment controller (REC) and remote units are encapsulated in an internal interface of the radio base station.

FIG. 6 shows a radio base station 20 wherein direct communications between a radio equipment controller (REC) 22 (at main site 23) and various remote units (at remote site 25) are encapsulated in the internal interface 26 of the radio base station. These remote units can comprise, interface, or communicate with the radio base station. These remote units may involve or facilitate radio transmission over one or more interfaces. One or more of these remote units, as well as radio equipment (RE) 24 itself, may be supported or held aloft at the remote site 25 by a horizontal pole or mast 100.

A non-limiting list of examples of these remote units (each illustrated in FIG. 6) includes one or more antenna 102, one or more tower mounted amplifiers (TMA) 104; and one or more units (106) related to the transmission network serving the radio access network (RAN), such as a microwave transmission unit. Each of the remote units is configured for direct communication with radio equipment controller (REC) 22. However, in contrast to the situation depicted in FIG. 13, in view of the encapsulation on internal interface 26 now provided these remote units do not require or have a dedicated or additional physical link with radio equipment (RE) 24.

These remote units are thus distinct from the radio equipment (RE) 24, although as in the case of antenna 102 and tower mounted amplifier (TMA) 104 they may be connected as downstream or upstream units to the radio equipment (RE) 24 for handling the traffic routed through the radio equipment (RE) 24. For example, the antenna 102 is connected to appropriate transmitter(s) and receiver(s) comprising the radio equipment (RE) 24. In the sense that aspects of operation of antenna 102 or the tower mounted amplifiers (TMA) 104 require operational control by or direct communication with radio equipment controller (REC) 22, the antenna 102 and tower mounted amplifiers (TMA) 104 are examples of distinct remote units of the radio base station. For example, the antenna 102 may be a remote electrical tilt (RET) antenna, i.e., an antenna whose tilt can be controlled by radio equipment controller (REC) 22 for controlling the coverage area. The radio equipment controller (REC) 22 inquires the status of the RET unit and sends control information for a desired tilt.

The tower mounted amplifier (TMA) 104 may also be called an ALNA or ASC, and is a low-noise amplifier for the receive signal of a radio base station (improving the sensitivity of the radio base station). The radio base station, and the radio equipment controller (REC) 22 in particular, inquires the status of the tower mounted amplifier (TMA) 104 and also inquires the gain of the tower mounted amplifier (TMA) 104, as well as the delay which the tower mounted amplifier (TMA) 104 occasions to the signal.

Alternatively, as in the case of transmission network unit 106, these other transmission structures or units may be entirely independent from (conventionally not even connected to) the radio equipment (RE) 24. In this regard, for example, some radio base stations use microwave based transmission for communication with other nodes of the RAN, such as the RNC. These RAN radio links are in communication with other nodes of the radio access network (RAN) over radio based transmission links. These RAN radio links are not to be confused with radio frequency transmissions over the air interface (e.g., UU interface in the UTRAN) with the user equipment units or mobile stations. An example of encapsulating a RAN interface on internal interface 26 is that the transmission between the radio base station and the radio network controller (RNC), e.g., the Iub interface, can be inserted on the internal interface 26 at the side of the radio equipment (RE) 24. Further, when the radio equipment controller (REC) 22 performs certain functions, such as ATM switching (for example), the transmission network unit 106 can also be used when communications between the radio equipment controller (REC) 22 and non-RAN equipment are encapsulated over internal interface 26. Thus, as used herein, the term "transmission network unit" encompasses not only RAN transmission units and units which are a part of the transmission network serving the radio access network (RAN), but also other units as well.

One or more Transmission network units 106 (comprising, e.g., transmitters and receivers) through which the radio base station communicates with other RAN nodes or even other non-RAN equipment over a radio link can also be mounted on the mast 100. The Transmission network unit(s) 106 serve, e.g., to receive the radio transmissions from other RAN nodes or other equipment and to forward the transmissions over traditional transmission lines (e.g., E1/T1 or STM1) to the radio base station. These Transmission network unit(s) are thus also example of distinct remote units situated at the remote site of radio base station 20.

Unlike the situation shown FIG. 13, the radio base station 20 of FIG. 6 does not require separate cables such as a transmission cable 1310 and antenna control cable 1312. Rather, the direct communications with one or more of the remote units is encapsulated over internal interface 26. The direct communications between the remote unit and radio equipment controller (REC) 22 which was encapsulated over the internal interface 26 is forwarded to/from the remote unit via a new physical link which connects the remote unit with the radio equipment (RE) 24. For example, FIG. 6 shows a physical link $130_1$ which connects radio equipment (RE) 24 with antenna 102 and tower mounted amplifier (TMA) 104. As one example, this new physical link $130_1$ can operate in accordance with the Antenna Interface Standard Group (AISG), low speed HDLC. If the antenna 102 is a remote electrical tilt (RET) antenna, the physical link $130_1$ can be connected to a RET unit or other suitable controls of antenna 102. FIG. 6 also shows a new physical link $130_2$ which connects radio equipment (RE) 24 with Transmission network unit 106.

It should be understood that encapsulation of direct communications between a remote unit and radio equipment controller (REC) 22 can occur for one or more remote units. Although FIG. 6 shows encapsulation as occurring for each of antenna 102, tower mounted amplifier (TMA) 104, and Transmission network unit 106, it should be understood that encapsulation could instead occur just for one, or any combination, of remote units. Further, it should be understood that there may be more than one remote unit of each type (e.g., more than one antenna), and even differing types of remote units from those herein described.

Figure 9:
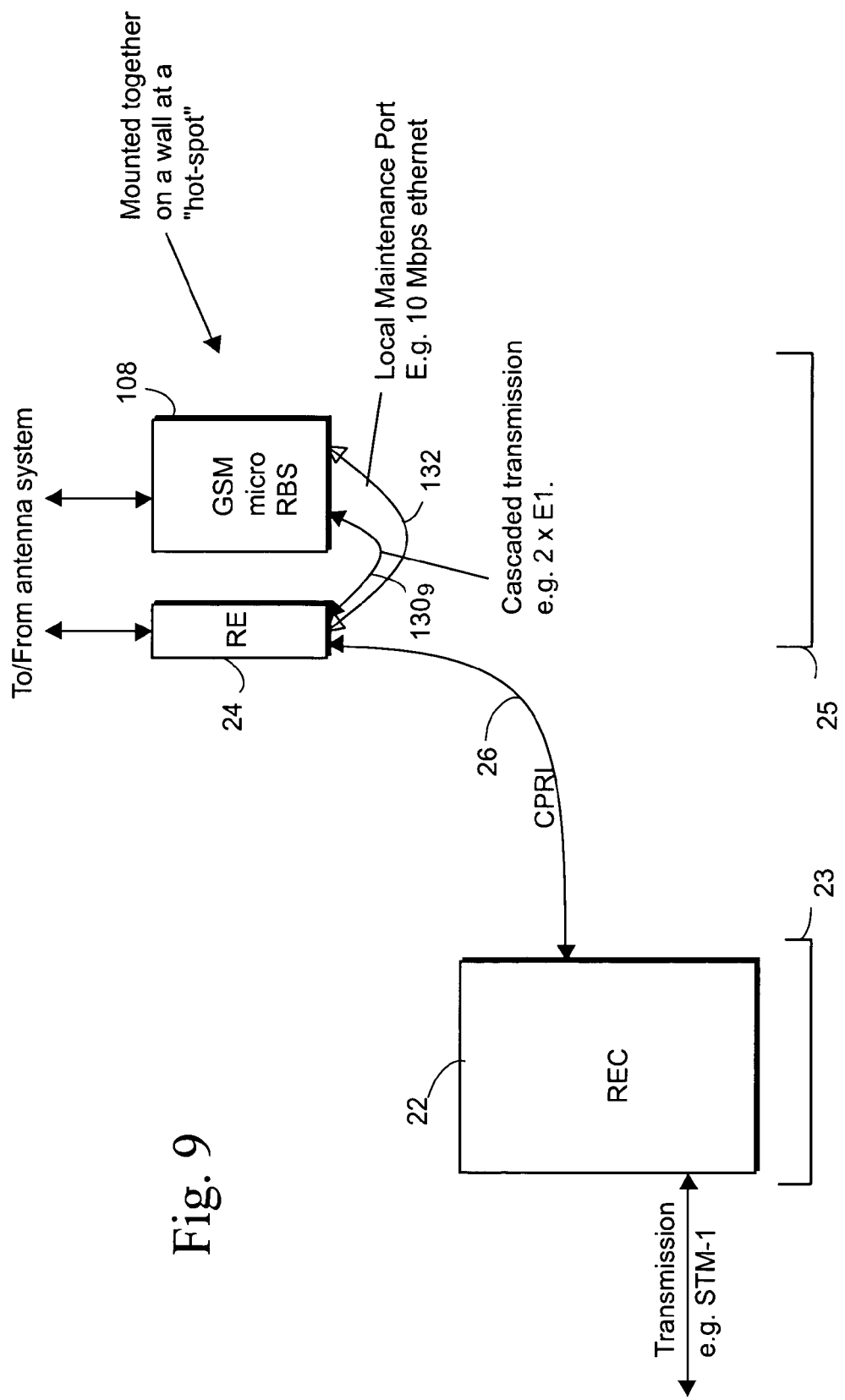
FIG. 9 is a diagrammatic view showing a radio base station wherein direct communications between a radio equipment controller (REC) and a remote unit in the form of a separate radio base station are encapsulated in an internal interface of the radio base station.

FIG. 9 shows another example type of remote unit in the form of a separate radio base station 108 which is co-located at the remote site 25. As an example, the separate radio base station 108 can be a GSM micro radio base station. In one example implementation, the radio equipment (RE) 24 may be co-located indoors with a GSM micro radio base station, with the traffic transmissions to and from the separate radio base station 108 being unrelated to and independent from those of the radio equipment (RE) 24. In the FIG. 9 example implementation the separate radio base station 108 is connected to radio equipment (RE) 24 by a cascaded transmission technique, e.g., two E1 cables show collectively as $130_9$ in FIG. 9. In addition, a local maintenance port of the separate radio base station 108 can be connected to the radio equipment (RE) 24 by an appropriate link, such as (for example) a 10 Mbps ethernet link 132.

Figure 10:
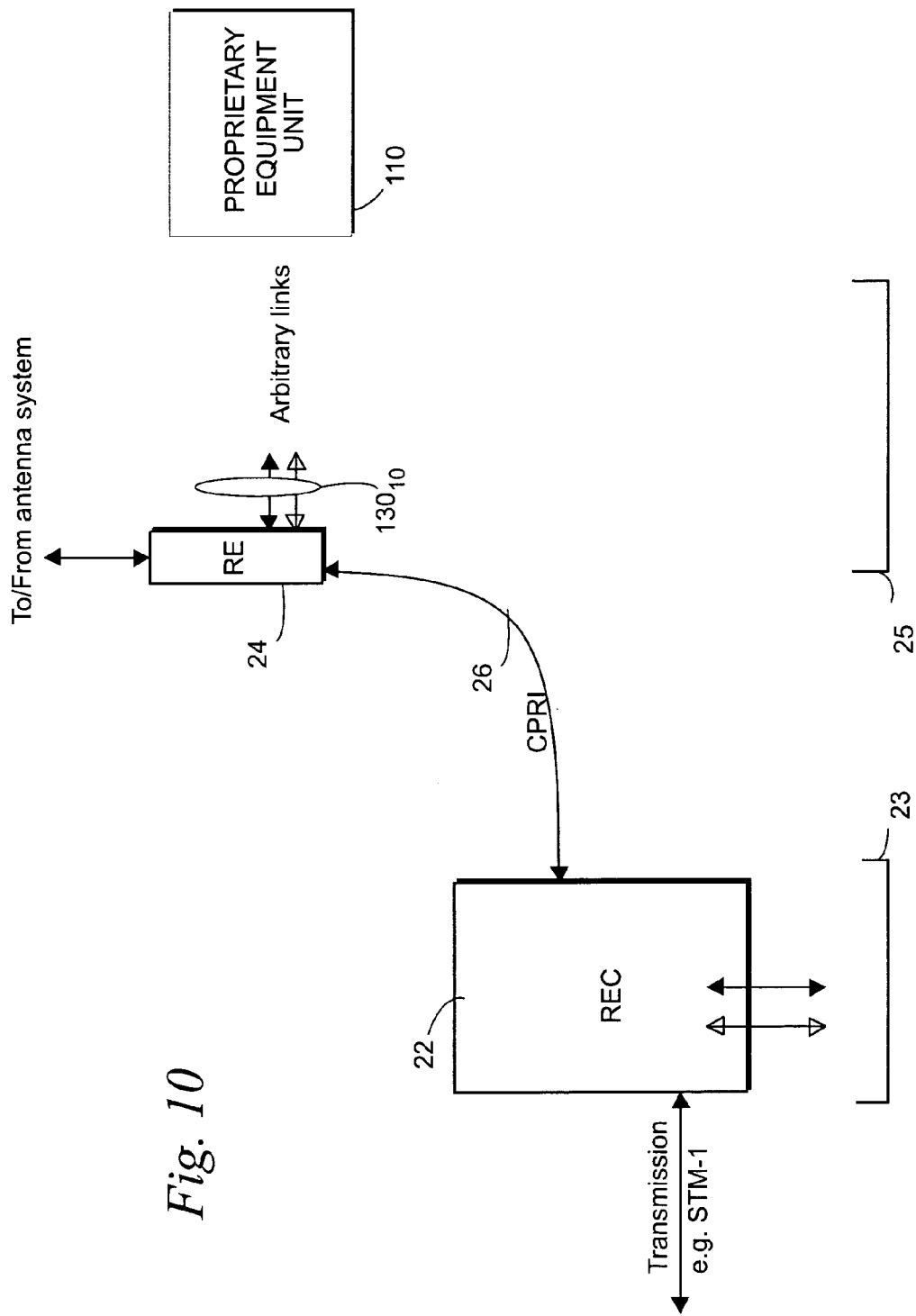
FIG. 10 is a diagrammatic view showing a radio base station wherein direct communications between a radio equipment controller (REC) and a remote unit in the form of proprietary equipment are encapsulated in an internal interface of the radio base station.

FIG. 10 shows another example type of remote unit in the form of proprietary equipment unit 110. In this example, if an operator has his own proprietary equipment with a proprietary equipment maintenance interface, the proprietary equipment maintenance interface can be connected by appropriate links $130_{10}$ to radio equipment (RE) 24. In this manner, the direct communications between proprietary equipment unit 110 and radio equipment controller (REC) 22 can be encapsulated in an the internal interface 26, rather than having a separate physical link.

Figure 11:
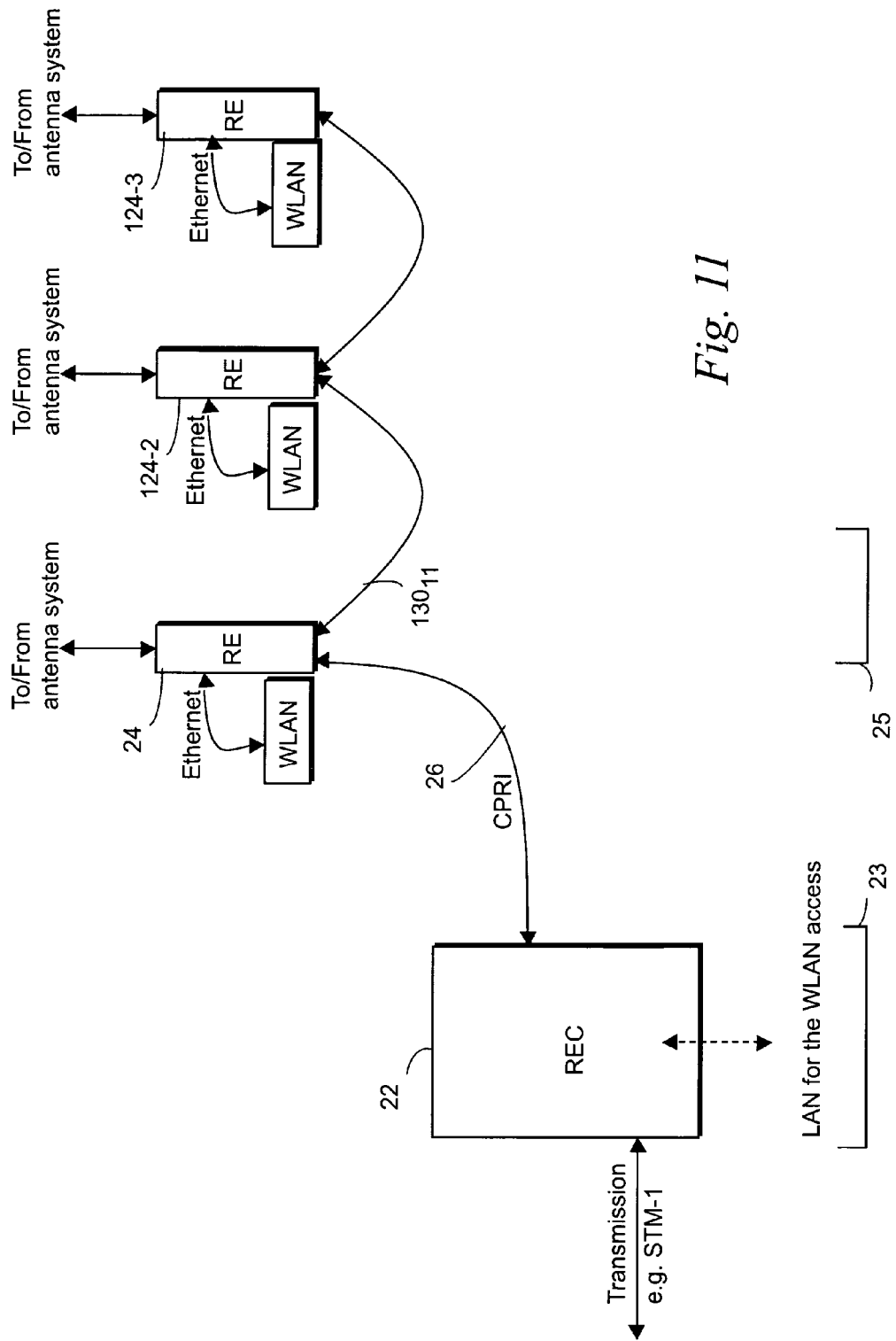
FIG. 11 is a diagrammatic view showing a radio base station wherein direct communications between a radio equipment controller (REC) and a remote unit (in the form of cascaded radio equipments (RE) with WLAN connections) are encapsulated in an internal interface of the radio base station.

FIG. 11 shows yet another example type of remote unit in the form of a cascaded radio equipment (RE) 124 with WLAN connections. The cascaded radio equipment (RE) 124 is connected to radio equipment (RE) 24 by an extra link $130_{11}$, and can be connected to further cascaded radio equipments (RE) 124. For example, FIG. 11 shows radio equipment (RE) 24 connected by link $130_{11}$ to cascaded radio equipment (RE) 124-1, and cascaded radio equipment (RE) 124-1 in turn connected to a second cascaded radio equipment (RE) 124-2.

In the embodiment of FIG. 11, indoor coverage can typically be achieved by having both WCDMA radio base stations and WLAN access points. The WLAN traffic can be encapsulated as one Ethernet link with switches in the radio equipment (RE) 24 to combine information from the different WLAN access points, or by having multiple encapsulated Ethernet links. FIG. 11 thus assumes a cascaded solution based on internal interface 26 (e.g., Common Public Radio Interface (CPRI)). The LAN of which the WLAN is part may either be accessed via a separate transmission, as indicated by the dashed line in FIG. 11, or be encapsulated over the normal transmission to the radio base station 20. Cascading of radio equipments (RE) is understood with reference to U.S. patent application 60/520,364, entitled "Interface, Apparatus, and Method for Cascaded Radio Units In A Main-Remote Radio Base Station", which is incorporated herein by reference.

In one example mode of implementation, the internal interface 26 is a Common Public Radio Interface (CPRI) as described in Common Public Radio Interface Specification Version 1.0 (Sep. 26, 2003) and Version 1.1 (May 10, 2004). Preferably, the direct communications between the radio equipment controller (REC) and the remote unit are encapsulated in an unused, free, or unallocated portion of a layer 2 protocol of the CPRI (see FIG. 2). Such unused, free, or unallocated portion of a layer 2 protocol are collectively referenced herein as "unallocated" portions. For example, the direct communications between the radio equipment controller (REC) and the remote unit may be encapsulated in a vendor specific information flow (44) of the layer 2 protocol. Alternatively, as another non-limiting example, the direct communications between the radio equipment controller (REC) and the remote unit may be encapsulated in an unused, free, or unallocated portion of user plane information (40) of the layer 2 protocol.

Figure 7:
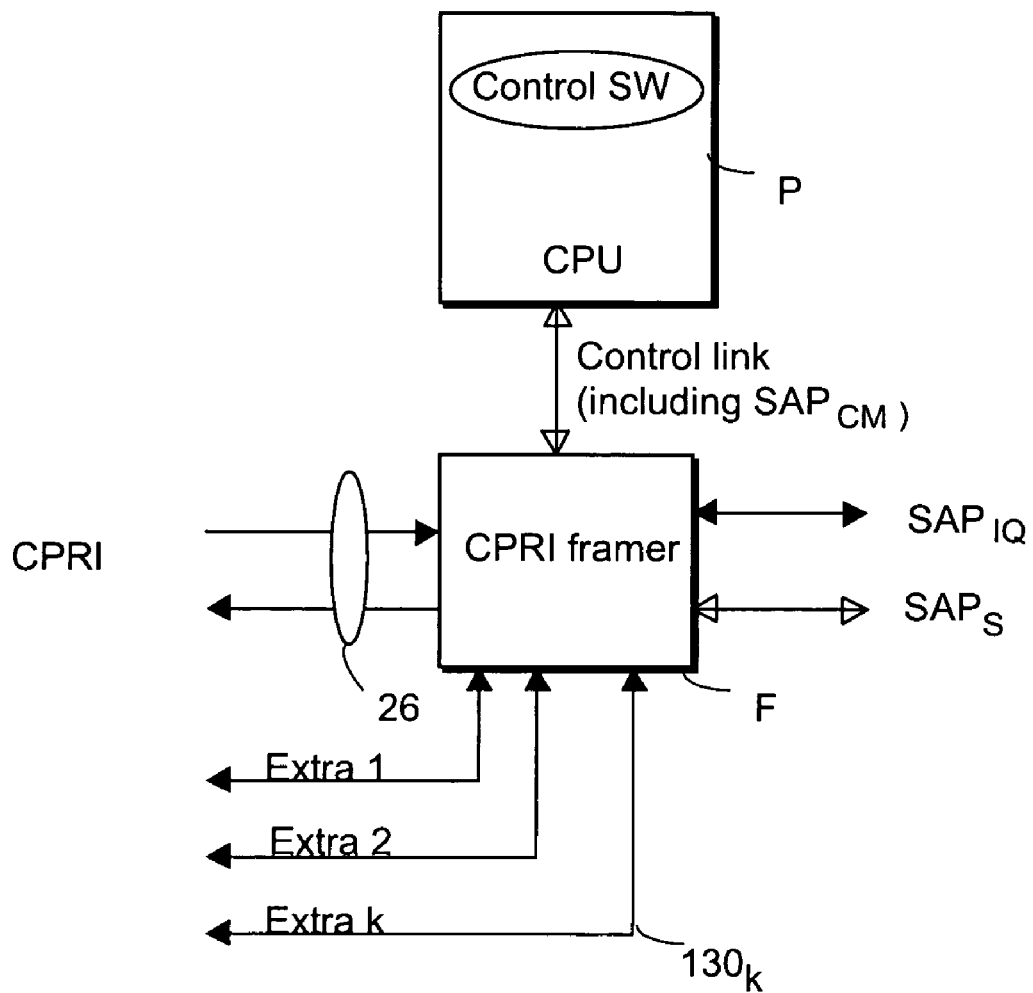
FIG. 7 is a schematic view of selected aspects of a framer for either a radio equipment controller (REC) or a radio equipment (RE).

FIG. 7 shows selected aspects of a framer for either a radio equipment controller (REC) or a radio equipment (RE). That is, the Framer F of FIG. 7 can be either framer 50 of radio equipment (RE) 24 or framer 70 of radio equipment controller (REC) 22. In like manner as previously illustrated, the framer F operates in conjunction with processor P (which can be processor 52 or processor 72). A control link which includes the service access point for the control and management connects the processor P and framer F. The service access point $SAP_{IQ}$ for the user plane information flow and the service access point $SAP_S$ for the synchronization are also shown, as well as the connection of framer F to internal interface 26.

In addition, the framer F is also connected to remote units or interfaces for remote units whose direct communications is now encapsulated by framer F for transmission over internal interface 26. To this end, FIG. 7 shows k number of extra links 130 connected to framer F. One or more of these extra links can be connected to antenna 102, to tower mounted amplifier (TMA) 104, or to Transmission network unit 106, or to any combination(s) of these remote units. Thus, these extra links 130 need not necessarily all be of the same type. For example, some (eight) of the extra links 130 can be E1 transmission links (for handling the direct communications of Transmission network unit 106, for example. One or more of the extra links 130 may be a 10 Mbps Ethernet link. There may also be plural (e.g., two) low speed HDLC links (for handling the 102 may be a 10 Mbps Ethernet link). There may also be plural (e.g., two) low speed HDLC links (for handling the antenna 102 and/or tower mounted amplifier (TMA) 104, for example). P In addition to providing means for coding and decoding, the framer F can decode and encode the information on the extra links 130 towards the internal interface 26. The control of the encoding/decoding is either via the control software (SW) in processor P, or via in-band signaling in the control words.

Figure 8:
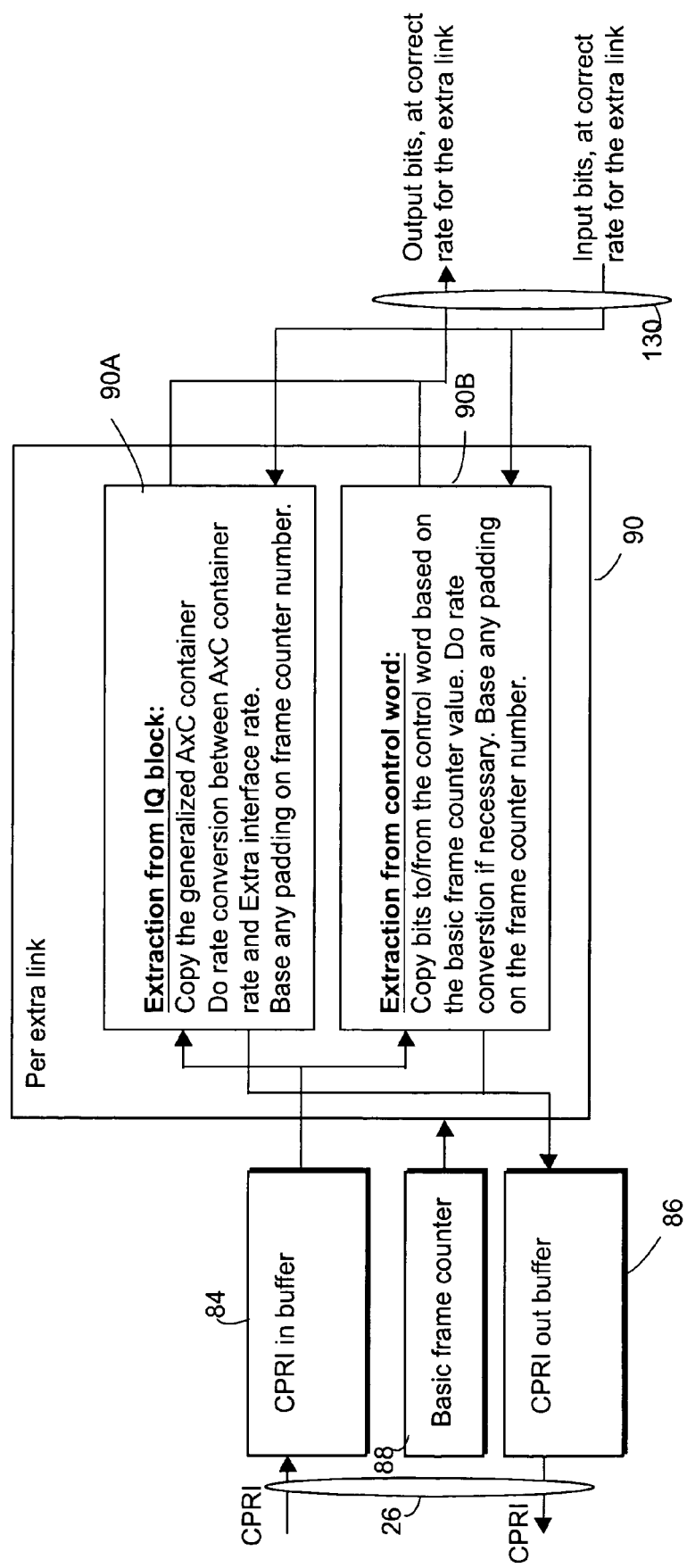
FIG. 8 is a schematic view of further selected aspects of a framer for either a radio equipment controller (REC) or a radio equipment (RE).

Further selected aspects of the framer F which facilitate encapsulation and transmission over the internal interface 26 of direct communications involving the remote are illustrated in FIG. 8. The framer F is shown as operating in conjunction with an internal interface in-buffer 84 (e.g., CPRI in-buffer); an internal interface out-buffer 86; and, a basic frame counter 88. The framer is shown as having, for each of the extra links 130, logic 90 for handling the direct communications of the corresponding remote unit. For example, in framer F there is logic for handling direct communications for each different type of remote unit interface. The framer logic 90 has two main processing sections 90A and 90B. Whatever remote unit is being handled, only one block is active at any one time, the active block being selected by the control software (SW).

Logic section 90A performed by framer F basically concerns extraction from an IQ block. Extraction from an IQ block is performed when the direct communication with the remote unit has been encapsulated in an unused, free, or unallocated portion of the user data flow 40 (see FIG. 2). Basic steps performed in the extraction of logic section 90A include (1) copying a generalized antenna-carrier (AxC) container; (2) performing any necessary rate conversion between the antenna-carrier (AxC) container and the rate of the pertinent extra link 130; and (3) basing any padding on the frame counter number.

Logic section 90B performed by framer F basically concerns extraction from a control word. Extraction from a control word is performed when the direct communication with the remote unit has been encapsulated in an unused, free, or unallocated portion of the layer 2 protocol such as the vendor specific information 44 (see FIG. 2). Basic steps performed in the extraction of logic section 90B include (1) copying bits to/from the control word based on the basic frame counter value; (2) performing any necessary rate conversion; and (3) basing any padding on the frame counter number.

In a sense, the internal interface 26 transfers information about absolute time. Therefore, the insertion of padding is a simple mathematical function which can be done identically in both radio equipment controller (REC) 22 and radio equipment (RE) 24. The frame number is utilized to insert or remove padding.

TABLE 1

| Link | Suggested Strategy |
| --- | --- |
| E1 over Control Word: 2.048 Mbps transmission | Use 9 control words per hyperframe and in 15 hyperframes use 2048 of 2160 available bits (112 padding bits, evenly spread) |
| 15 × E1 over IQ block: | 15 E1 can be easily encapsulated by means of interleaving: define a 8 bit antenna-carrier container and use every $15^{th}$ frame per E1. |
| STM-1: 155.52 Mbps over IQ block | Define one antenna-carrier of size 42 and use 81 of 84 bits over every two frames, spread the remaining three bits evenly over every two frames. |

The complexity of the blocks depends on what type of extra link 130 is being handled. Table 1 shows some example parameters and framing techniques for differing types of links.

Thus, in the case of a Transmission network unit 106, an interface at the Transmission network unit 106 is connected by new link $130_2$ to radio equipment (RE) 24, whose framer 70 forwards to the internal interface 26 in a manner such as that described above. At the other end of the internal interface 26, the radio equipment controller (REC) 22 extracts the direct communications from the Transmission network unit 106, and sends it to an interface (such as an extension terminal) for use internally in the radio equipment controller (REC) 22 for the Iub link. For example, the transmission on the link $130_2$ is for the radio base station, and parts of it can be for other units on the same transmission network. Processing in the reverse direction occurs in similar manner.

In the case of antenna 102 and/or a tower mounted amplifier (TMA) 104, the direct communications from radio equipment controller (REC) 22 to the RET control of antenna 102 or to the tower mounted amplifier (TMA) 104 is encapsulated on the internal interface 26 and forwarded by radio equipment (RE) 24 over the appropriate new physical link 130 to the appropriate mast-mounted equipment.

In the case of separate radio base station 108, transmissions to the separate radio base station 108 are sent by radio equipment controller (REC) 22 over internal interface 26 to the radio equipment (RE) 24, and from radio equipment (RE) 24 to separate radio base station 108. Processing in the reverse direction occurs in similar manner.

Thus, there is now achieved, e.g., one or more of the following: encapsulating on internal interface 26 another interface which is not related to the (ordinary conventional) communication between the radio equipment controller (REC) 22 and radio equipment (RE) 24; using the internal interface 26 to control remote units which are distinct from the radio equipment (RE) 24.

Figure 12A:
FIG. 12A is a diagrammatic view showing several internal interface physical links connecting a radio equipment controller (REC) and a radio equipment (RE).
Figure 12B:
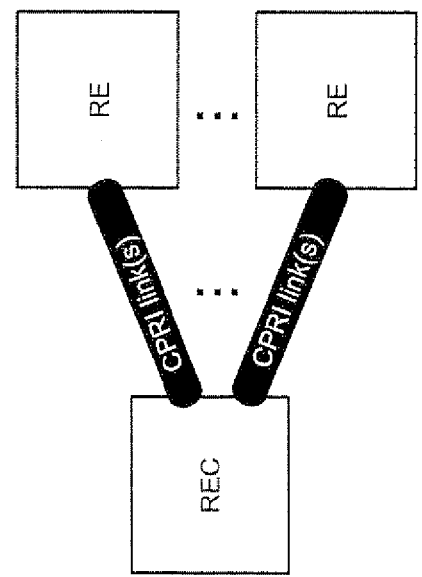
FIG. 12B is a diagrammatic view showing several radio equipment entities (RE) being served by one radio equipment controller (REC).

The invention has been described in a basic configuration in which one radio equipment controller (REC) 22 and one radio equipment (RE) 24 are connected by a single CPRI physical link. The invention is not limited to this configuration, but should be understood to be extended to other configurations including but not limited to those described in Common Public Radio Interface Specification Version 1.0 (Sep. 26, 2003) and Version 1.1 (May 10, 2004). For example, as illustrated in FIG. 12A, the invention may be implemented in a configuration in which several CPRI physical links can be used to enhance the system capacity required for large system configurations involving many antennas and carriers. Moreover, as illustrated in FIG. 12B, several radio equipment entities may be served by one radio equipment controller (REC) 22.

While the invention has been described in connection with what is presently considered to be the most practical and preferred embodiment, it is to be understood that the invention is not to be limited to the disclosed embodiment, but on the contrary, is intended to cover various modifications and equivalent arrangements.

What is claimed is:

1. A radio base station comprising:
    a radio equipment controller (REC) situated at a main site;
    a radio equipment (RE) situated at a remote site;
    a remote unit configured to engage in direct communications with the radio equipment controller (REC);
    an internal interface connecting the radio equipment controller (REC) and the radio equipment (RE), the internal interface being Common Public Radio Interface (CPRI), and wherein in addition to carrying conventional Common Public Radio Interface communications the internal interface also encapsulates the direct communications between the radio equipment controller (REC) and the remote unit for providing an interface between the remote unit and the radio equipment controller (REC) for controlling the remote unit and thereby obviating a separate physical link between the radio equipment controller (REC) and the remote unit; and
    a physical link for transmitting, between the radio equipment (RE) and the remote unit, the direct communications between the radio equipment controller (REC) and the remote unit which are encapsulated over the internal interface.

2. The apparatus of claim 1, wherein the direct communications between the radio equipment controller (REC) and the remote unit are encapsulated in an unallocated portion of a layer 2 protocol.

3. The apparatus of claim 1, wherein the direct communications between the radio equipment controller (REC) and the remote unit are encapsulated in a vendor specific information flow of a layer 2 protocol.

4. The apparatus of claim 1, wherein the direct communications between the radio equipment controller (REC) and the remote unit are encapsulated in an unallocated portion of user plane information of a layer 2 protocol.

5. The apparatus of claim 1, wherein the remote unit is a tower mounted amplifier (TMA).

6. The apparatus of claim 1, wherein the remote unit is an antenna with remote electrical tilt control.

7. The apparatus of claim 1, wherein the remote unit is part of a transmission network of a radio access network (RAN).

8. The apparatus of claim 1, wherein the remote unit is a separate radio base station which is co-located at the remote site.

9. The apparatus of claim 8, wherein the separate radio base station is a GSM micro radio base station.

10. The apparatus of claim 1, wherein the remote unit is a proprietary equipment unit.

11. The apparatus of claim 1, wherein the remote unit is a cascaded radio equipment.

12. A method of operating a radio base station having an internal interface connecting a radio equipment (RE) at a main site and a radio equipment controller (REC) at a remote site, the internal interface being a Common Public Radio Interface (CPRI), the radio base station further having a remote unit configured to engage in direct communications with the radio equipment controller (REC); the method comprising:
    in addition to carrying conventional Common Public Radio Interface communications, encapsulating over the internal interface the direct communications between the radio equipment controller (REC) and the remote unit for providing an interface between the remote unit and the radio equipment controller (REC) for controlling the remote unit and thereby obviating a separate physical link between the radio equipment controller (REC) and the remote unit; and
    transmitting, between the radio equipment (RE) and the remote unit, the direct communications between the radio equipment controller (REC) and the remote unit which are encapsulated over the internal interface.

13. The method of claim 12, further comprising encapsulating over the internal interface the direct communications between the radio equipment controller (REC) and the remote unit in an unallocated portion of a layer 2 protocol.

14. The method of claim 12, further comprising encapsulating over the internal interface the direct communications between the radio equipment controller (REC) and the remote unit in a vendor specific information flow of a layer 2 protocol.

15. The method of claim 12, further comprising encapsulating over the internal interface the direct communications between the radio equipment controller (REC) and the remote unit in an unallocated portion of user plane information of a layer 2 protocol.

16. The method of claim 12, wherein the remote unit is a tower mounted amplifier (TMA).

17. The method of claim 12, wherein the remote unit is an antenna with remote electrical tilt control.

18. The method of claim 12, wherein the remote unit is part of a transmission network of a radio access network (RAN).

19. The method of claim 12, wherein the remote unit is a separate radio base station which is co-located at the remote site.

20. The method of claim 19, wherein the separate radio base station is a GSM micro radio base station.

21. The method of claim 12, wherein the remote unit is a proprietary equipment unit.

22. The method of claim 12, wherein the remote unit is a cascaded radio equipment (RE).

23. A radio base station comprising:
    a radio equipment controller (REC) situated at a main site;
    a radio equipment (RE) situated at a remote site;
    a remote unit configured to engage in direct communications with the radio equipment controller (REC);

an internal interface connecting the radio equipment controller (REC) and the radio equipment (RE) and which carries user plane data for at least one antenna carrier, the internal interface being a Common Public Radio Interface (CPRI), and wherein in addition to canning conventional Common Public Radio Interface communications the internal interface also encapsulates using a layer protocol the direct communications between the radio equipment controller (REC) and the remote unit for providing an interface between the remote unit and the radio equipment controller (REC) for controlling the remote unit and thereby obviating a separate physical link between the radio equipment controller (REC) and the remote unit; and wherein the remote unit comprises at least one of the following:

a tower mounted amplifier (TMA);

an antenna with remote electrical tilt control;
at least part of a transmission network of a radio access network (RAN);
a separate radio base station which is co-located at the remote site.

24. The apparatus of claim 23, wherein the direct communications between the radio equipment controller (REC) and the remote unit are encapsulated in an unallocated portion of a layer 2 protocol.

25. The apparatus of claim 23, further comprising plural remote units configured to engage in direct communications with the radio equipment controller (REC), and wherein the internal interface also encapsulates communications between the radio equipment controller (REC) and the plural remote units for obviating plural separate physical links between the radio equipment controller (REC) and the remote unit.

* * * * *

UNITED STATES PATENT AND TRADEMARK OFFICE
CERTIFICATE OF CORRECTION

PATENT NO.        : 7,529,215 B2                                   Page 1 of 1
APPLICATION NO. : 10/909836
DATED             : May 5, 2009
INVENTOR(S)      : Osterling It is certified that error appears in the above-identified patent and that said Letters Patent is hereby corrected as shown below:

In Column 5, Line 35, delete "Jub" and insert -- Iub --, therefor.

In Column 5, Line 37, delete "Jub transport and Jub" and insert -- Iub transport and Iub --, therefor.

In Column 11, Line 41, after "example)." delete "P".

In Column 13, Line 37, in Claim 1, delete "being" and insert -- being a --, therefor.

In Column 15, Line 5, in Claim 23, delete "canning" and insert -- carrying --, therefor.

Signed and Sealed this

Tenth Day of November, 2009

David J. Kappos
*Director of the United States Patent and Trademark Office*